United States Patent [19]

Czernichowsky

[11] 4,341,584
[45] Jul. 27, 1982

[54] MULTIPLE DISC STITCHER

[75] Inventor: Krystian G. Czernichowsky, Ettelbruck, Luxembourg

[73] Assignee: The Goodyear Tire & Rubber Company, Akron, Ohio

[21] Appl. No.: 262,135

[22] Filed: May 11, 1981

[51] Int. Cl.³ .................. B29H 17/18; B21B 13/02; B21B 31/08
[52] U.S. Cl. .................. 156/412; 156/421; 156/488; 29/125; 29/130; 29/116 R
[58] Field of Search .............. 156/408, 409–411, 156/412, 413, 421, 488, 128, 133; 29/124, 125, 129, 130, 116 R

[56] References Cited

U.S. PATENT DOCUMENTS

| 1,834,559 | 12/1931 | Waner | 156/412 |
|---|---|---|---|
| 1,869,317 | 7/1932 | Stevens | 156/412 |
| 2,381,383 | 8/1945 | Steinel | 156/115 |
| 2,464,020 | 3/1949 | Breth | 156/412 |
| 2,490,445 | 12/1949 | Kuffler | 156/412 |
| 2,600,291 | 6/1952 | Engler | 156/412 |
| 2,838,091 | 6/1958 | Kraft | 156/412 |
| 4,052,246 | 10/1977 | Albareda | 156/412 |
| 4,163,685 | 8/1979 | Kubinski | 156/421 |
| 4,170,509 | 10/1979 | Kubinski | 156/405 R |

*Primary Examiner*—Edward C. Kimlin
*Assistant Examiner*—Lois E. Boland
*Attorney, Agent, or Firm*—Frederick K. Lacher; T. P. Lewandowski

[57] ABSTRACT

A stitcher for a tire building machine having multiple discs disposed in concentric laminated relationship for relative movement in the radial and circumferential directions. The discs have a central opening in which a central supporting member is rotatably supported on a stitcher shaft. A plurality of circumferentially spaced cylindrical cushioning members are positioned between the central supporting member and the discs for resiliently accommodating relative radial movement of the discs when stitching tire surfaces of different radii. The central supporting member may have radially extending curved arms to separate and support the cylindrical cushioning members. The outer shell of the cushioning members may be of wear-resistant material in sliding engagement with the discs so that during relative rotational movement of said discs there will be a minimum amount of wear of the cushioning members and discs.

12 Claims, 6 Drawing Figures

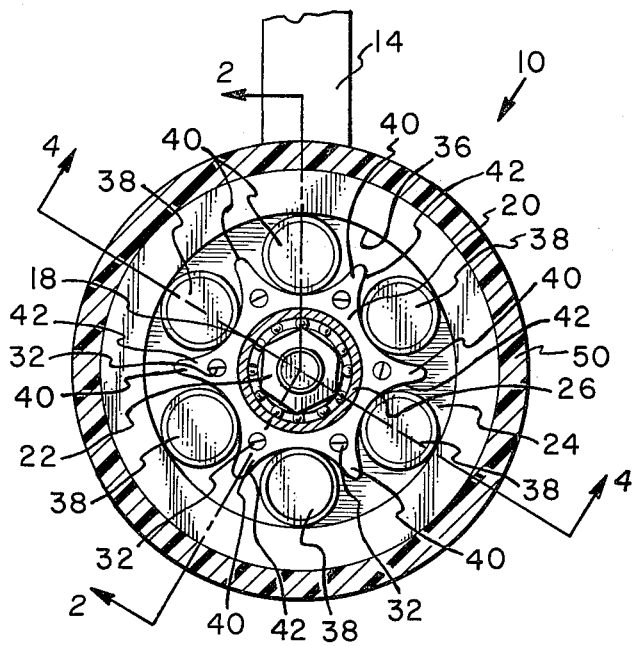
FIG. 1
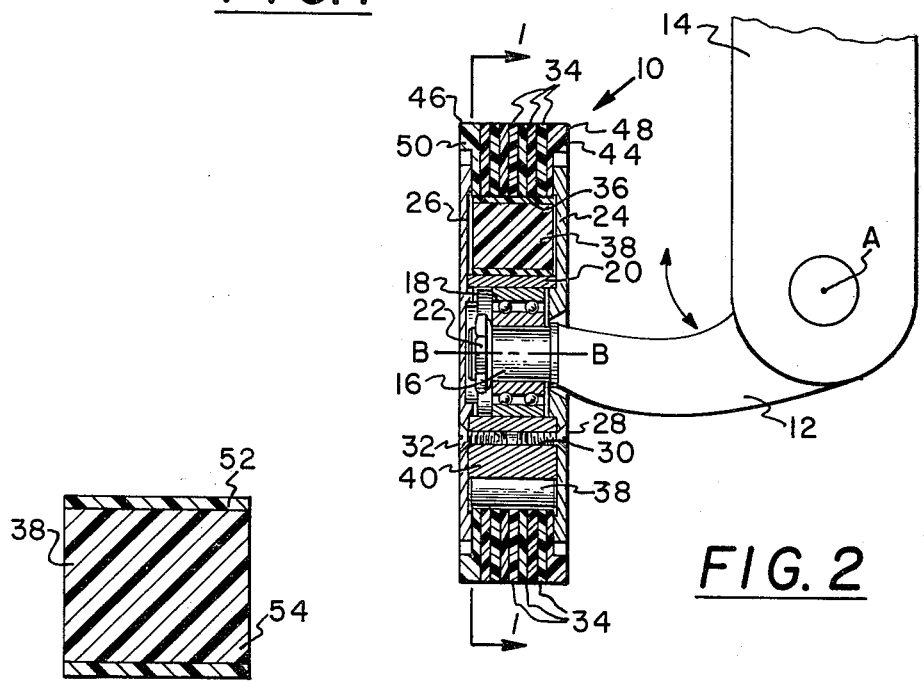
FIG. 2
FIG. 3

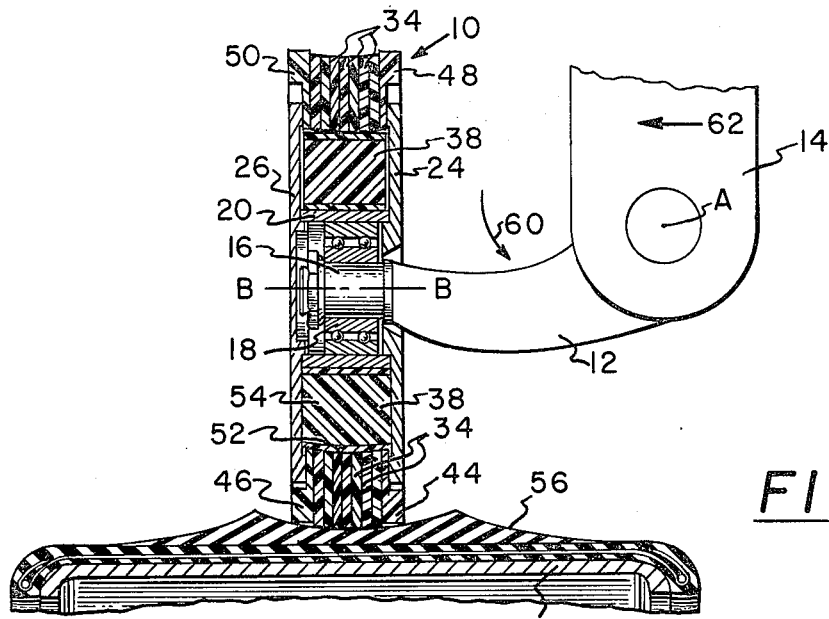
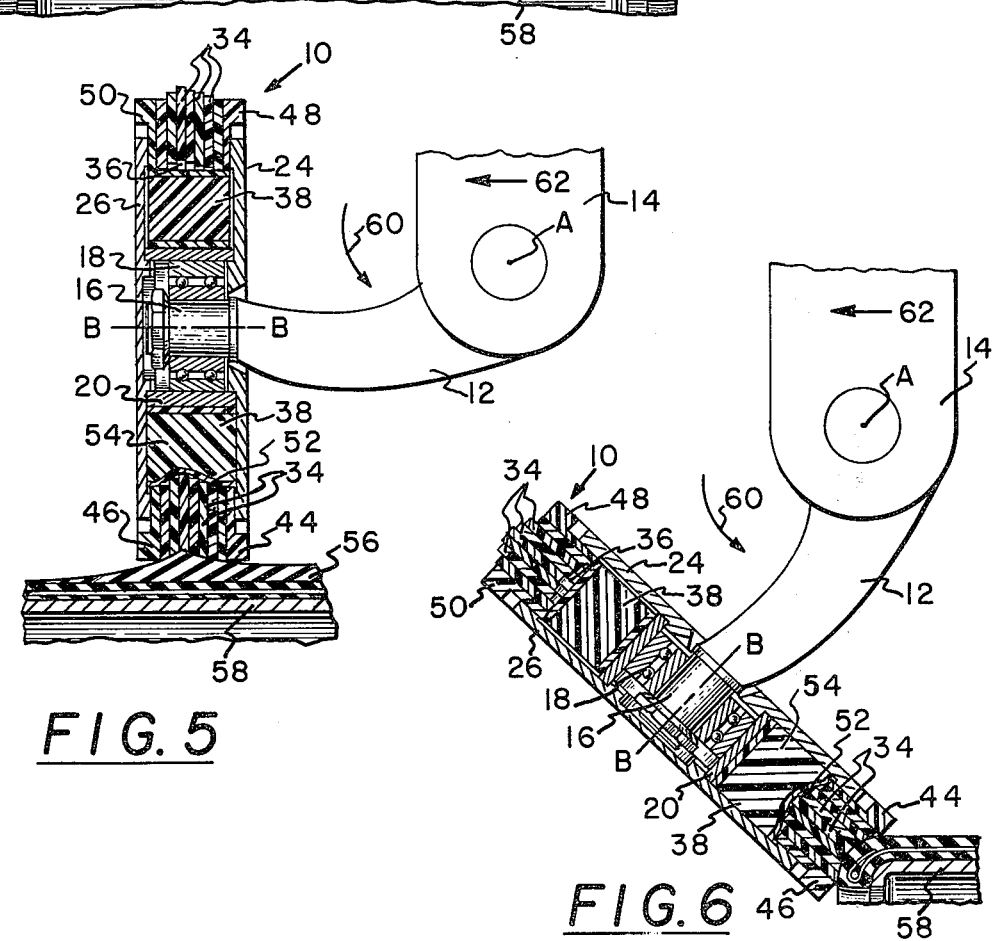
FIG. 4
FIG. 5
FIG. 6

MULTIPLE DISC STITCHER

This invention relates to stitchers for tire building machines and especially to tread stitchers of the type in which the stitcher is moved axially and in a helical path to compact the tire against a supporting rotating drum. Heretofore a single disc has been used which has resulted in a relatively slow operation because a substantial number of revolutions of the drum are required to traverse the tire surface satisfactorily.

Other stitchers for this purpose have had a multiplicity of discs movable radially into engagement with the tire. The width of these stitchers has been generally the same as the width of the tire on the drum. During operation, each disc compacts a different longitudinal section of the tire and it is desirable that the pressure exerted be uniformly distributed over the width of the tire. The distribution of pressure has been provided either by controlling the cushioning pressure on the different discs or by using discs with different diameters to conform with the contour of the tread surface.

It has been proposed to use an axially movable stitcher having a greater width than the width of a single disc so that the number of revolutions of the tire can be reduced and time saved during the building operation. In order to widen the stitcher wheel it is desirable that the stitcher surface be adaptable to conform with the different diameters of the tread surface. It is also important that the stitcher be compact and lightweight. Where different discs are used, provision needs to be made to compensate for the different rotational speeds of the discs due to the different diameters along the tread surface. Where the discs are supported resiliently by cushioning bodies, the relative rotation of the discs presents a wear problem because normally a cushioning body does not have good wear resistance. Support of the discs is also a problem when they are subjected to shear stresses during axial movement of the stitcher.

The present invention is directed to a multiple disc stitcher which is lightweight with cushioning bodies supported and spaced between the stitcher axis and the tire compacting discs. The cushioning bodies have resilience for accommodating relative radial movement of the discs in engagement with sections of the tread surface having different diameters. The cushioning bodies also have wear-resistant surfaces for slidably supporting the discs during rotation relative to each other and relative to the cushioning bodies. The support and spacing of the discs and cushioning bodies also provides resistance to forces in shear generated during operation of the stitcher.

In accordance with an aspect of the invention a multiple disc stitcher is provided rotatable about a stitcher axis for use in building tires and comprising a plurality of disc members positioned generally in concentric laminated relationship about the stitcher axis, the discs having a central opening, support means extending axially through the opening providing a single continuous beam support, each of the disc members being independently rotatable and slidable relative to adjacent disc members, the support means including a plurality of generally cylindrical elastic members spaced circumferentially around an axially extending support member, each of the elastic members extending through the central opening to resiliently support the disc members while permitting radial displacement relative to the support member, and each of the elastic members having a wear-resistant surface with a low resistance to sliding of the disc members on the elastic members to reduce the wear when different disc members are rotated at different speeds relative to the elastic members.

In accordance with another aspect of the invention, a multiple disc stitcher is provided rotatable about a stitcher axis for use in building tires and comprising a plurality of disc members positioned generally in concentric laminated relationship about the stitcher axis and having a central opening, support means extending axially through the opening providing a single continuous beam support, each of the disc members being independently rotatable and slidable relative to adjacent disc members, these support means including an axially extending support member and a plurality of generally cylindrical elastic members spaced circumferentially around the support member, each of the elastic members extending through the central opening to resiliently support the disc members while permitting radial displacement relative to the support member, and the support member having radially extending arms spaced apart circumferentially for spacing and supporting the elastic members.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

In the annexed drawings:

FIG. 1 is a fragmentary side elevational view in section taken along line 1—1 in FIG. 2 of a preferred form of stitcher embodying the invention.

FIG. 2 is a sectional view taken along the planes of line 2—2 in FIG. 1.

FIG. 3 is an enlarged view of one of the cylindrical elastic members.

FIG. 4 is a view like FIG. 2 except with a single diametrical cutting plane 4—4, showing the stitcher in engagement with a tire on a tire building drum and with the tire and tire building drum being shown in a fragmentary sectional view.

FIG. 5 is a view like FIG. 4 showing the stitcher compacting the tire at a different position along the surface of the tire.

FIG. 6 is another view like FIGS. 4 and 5 but showing the stitcher compacting the tire at the bead portion around the edge of the drum.

Referring to FIGS. 1 and 2, a multiple disc stitcher 10 is shown rotatably mounted on a swingable arm 12 pivotally mounted about an axis A on a bracket 14 of a tire building machine. The bracket 14 may be movable with the stitcher 10 in a direction axially of the tire building drum (not shown). The arm 12 has a stub shaft 16 on which a suitable bearing such as roller bearing 18 is mounted for supporting a support member such as ring member 20. The bearing 18 is held in position by a nut 22 threaded on the end of the shaft 16. Mounted at each end of the ring member 20 are end assemblies such as inner plate member 24 and outer plate member 26. Screws 28 threaded in holes 30 in the ring member 20 and extending through the inner plate 24 fasten the inner plate member to the ring member. Screws 32 threaded in the holes 30 and extending through the outer plate member 26 fasten the outer plate member to the ring member 20.

A plurality of disc members 34 are positioned in concentric laminated relationship about the axis B—B of the stitcher 10 and have a central opening 36 through which the support means extends axially to provide a single continuous beam support for the disc members 34. The support means includes the ring member 20 and a plurality of generally cylindrical elastic members 38 spaced circumferentially around the axially extending ring member 20. Each of the elastic members 38 has a diameter less than the diameter of the central opening 36 in the disc members 34 and extends through the opening to resiliently support the disc members while permitting radial displacement relative to the ring member 20.

The ring member 20 may have radially extending arms 40 spaced circumferentially of the ring member for spacing and supporting the cylindrical elastic members 38. The arms 40 may have curved surfaces 42 to at least partially conform to the surfaces of the cylindrical elastic members 38.

The disc members 34 include end disc members 44 and 46 having the same inner and outer diameter as the other disc members but having circumferentially extending annular reinforcing ribs 48 and 50, respectively, at the axially and radially outer edges of the stitcher 10. The inner plate member 24 and outer plate member 26 preferably have a thickness at the outer periphery which is substantially the same as the thickness of the reinforcing ribs 48 and 50 as shown in FIG. 2. The plate members 24 and 26 also have a diameter less than the radially inner diameter of the ribs 48 and 50 so that the end disc members 44 and 46 may move radially relative to the plate members.

The disc members 34 including the end disc members 44 and 46 are preferably of a high modulus plastic material such as molded nylon so that they may be independently rotatable and slidable relative to adjacent disc members. Referring to FIG. 3, each of the elastic members 38 is cylindrical and has an outer shell 52 of a flexible material with a low coefficient of friction such as Teflon. An inner core 54 is preferably of an elastic resilient cushioning material such as polyurethane for permitting relative radial movement of the disc members 34 while the outer shell 52 permits relative rotational movement of adjacent disc members.

Referring to FIGS. 4, 5 and 6, operation of the stitcher 10 is illustrated in various positions during the compacting of a tire 56 which has been built on a collapsible drum 58 in a manner well known to those skilled in the art. The stitcher 10 is urged into engagement with the surface of the tire 56 by suitable means such as air cylinders (not shown) swinging the arm 12 relative to the bracket 14 in the direction shown by arrow 60. The drum 58 is rotated and at the same time the bracket 14 is moved in an axial direction indicated by arrow 62. As shown in FIG. 4, the surface of the tire 56 engaged by the stitcher 10 is generally concave and the disc members 34 are pressed against the elastic members 38 which deflect so that the disc members generally conform with the contour of the surface of the tire. In FIG. 4, the end disc members 44 and 46 are deflected a greater amount than the discs between them.

In FIG. 5, the stitcher 10 is shown traversing another section of the tire 56 which has a generally convex cross section and the end disc members 44 and 46 are not deflected as much as the disc members 34 therebetween. In FIG. 6, the stitcher 10 is rotated by movement of arm 12 around the bead portion of the tire 56 and, here again, the end disc members 44 and 46 are deflected less than the disc members 34 therebetween.

When the disc members 34 are deflected different amounts as shown in FIGS. 4, 5 and 6, the different disc members will rotate at different speeds because of their engagement with sections of the surface of the tire 56 which have different diameters. This difference in rotation of the disc members 34 results in sliding movement of the disc members against the outer shell 52 of the elastic members 38. The outer shell 52 is of a wear-resistant material having a low coefficient of friction so that this difference in rotational movement of the disc members 34 will not have an adverse affect upon the tire 56 or prematurely wear out the elastic members 38. At the same time the cushioning necessary to distribute the pressure uniformly over the surface of the tire 56 is provided by the cushioning material of the inner core 54 which may deflect substantially as shown in FIGS. 4, 5 and 6.

It can also be seen that by utilizing the ring member 20 with arms 40 to support and separate the cylindrical elastic members 38 a lightweight construction of the stitcher 10 is provided in which the required cushioning is obtained with a minimum of frictional resistance to the differential rotation of the disc members 34. The stitcher 10 also has a sufficient width to traverse the surface of the tire 56 at a relatively rapid axial speed of the bracket 14 since the width of the helix path covered by the stitcher disc members 34 is sufficient to reduce the number of revolutions of the drum 58 required to cover the tire surface. Also the support provided by the inner plate member 24 and outer plate member 26 and by the end disc members 44 and 46 with ribs 48 and 50 gives the stitcher 10, including the disc members 34, the necessary rigidity to resist the shear forces on the stitcher during the axial movement in the direction of arrow 62 as the stitcher is moved across the surface of the tire 56. It can also be seen that the stitcher 10 is adaptable for use with tires built in a toroidal shape as well as in the generally cylindrical shape as shown in FIGS. 4, 5 and 6.

While a certain representative embodiment and details have been shown for the purpose of illustrating the invention, it will be apparent to those skilled in the art that various changes and modifications may be made therein without departing from the spirit or scope of the invention.

What is claimed is:

1. A multiple disc stitcher rotatable about a stitcher axis for use in building tires comprising a plurality of disc members positioned generally in concentric laminated relationship about said axis, said disc members having a central opening, support means extending axially through said opening providing a single continuous beam support, each of said disc members being independently rotatable and slidable relative to adjacent disc members, said support means including a plurality of generally cylindrical elastic members spaced circumferentially around an axially extending support member, each of said elastic members extending through said central opening to resiliently support said disc members while permitting radial displacement relative to said support member, and each of said elastic members having a wear-resistant surface with a low resistance to sliding of said disc members on said elastic members to reduce the wear when different disc members are rotated at different speeds relative to said elastic members.

2. The multiple disc stitcher of claim 1 wherein said support member includes an axially extending ring member having radially extending arms spaced apart circumferentially for spacing and supporting said cylindrical elastic members.

3. The multiple disc stitcher of claim 2 wherein the surfaces of said axially extending ring member and said arms are curved to at least partially conform to the surfaces of said cylindrical elastic members for supporting engagement during operation.

4. The multiple disc stitcher of claim 1 wherein each of said cylindrical elastic members has an outer shell of a flexible material having a low coefficient of friction and an inner core of elastic material.

5. The multiple disc stitcher of claim 4 wherein said outer shell is of Teflon and said inner core is of polyurethane.

6. The multiple disc stitcher of claim 1 wherein said disc members include end disc members and said end disc members have circumferentially extending annular reinforcing ribs at the axially and radially outer edges of said stitcher.

7. The multiple disc stitcher of claim 6 wherein a pair of end assemblies are positioned adjacent said end disc members and connected to said support member, each of said end assemblies including a plate member having an outer edge with a thickness substantially the same as the thickness of one of said reinforcing ribs and said plate member of each of said end assemblies having a diameter less than the radially inner diameter of said reinforcing ribs.

8. A multiple disc stitcher rotatable about a stitcher axis for use in building tires comprising a plurality of disc members positioned generally in concentric laminated relationship about said axis and having a central opening, support means extending axially through said opening providing a single continuous beam support, each of said disc members being independently rotatable and slidable relative to adjacent disc members, said support means including an axially extending support member and a plurality of generally cylindrical elastic members spaced circumferentially around said support member, each of said elastic members extending through said central opening to resiliently support said disc members while permitting radial displacement relative to said support member, and said support member having radially extending arms spaced apart circumferentially and extending between adjacent cylindrical elastic members for spacing and supporting said elastic members.

9. The multiple disc stitcher of claim 8 wherein each of said cylindrical elastic members has an outer shell of a flexible material having a low coefficient of friction and an inner core of elastic material.

10. The multiple disc stitcher of claim 9 wherein said outer shell is of Teflon and said inner core is of polyurethane.

11. The multiple disc stitcher of claim 8 wherein said disc members include end disc members and said end disc members have circumferentially extending annular reinforcing ribs at the axially and radially outer edges of said stitcher.

12. The multiple disc stitcher of claim 11 wherein a pair of end assemblies are positioned adjacent said end disc members and connected to said support member, each of said end assemblies including a plate member having an outer edge with a thickness substantially the same as the thickness of one of said reinforcing ribs and said plate member of each of said end assemblies having a diameter less than the radially inner diameter of said reinforcing ribs.

* * * * *